(12) United States Patent
Bugenhagen (10) Patent No.: US 8,310,937 B2
(45) Date of Patent: Nov. 13, 2012

(54) VOICE PACKET DYNAMIC ECHO CANCELLATION SYSTEM

(75) Inventor: Michael K. Bugenhagen, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1015 days.

(21) Appl. No.: 12/128,246

(22) Filed: May 28, 2008

(65) Prior Publication Data

US 2009/0296610 A1    Dec. 3, 2009

(51) Int. Cl.
*H04J 1/16* (2006.01)
*H04B 3/20* (2006.01)
*H04L 12/66* (2006.01)

(52) U.S. Cl. ........ 370/241; 370/253; 370/289; 370/356; 370/389

(58) Field of Classification Search .................. None
See application file for complete search history.

(56) References Cited

U.S. PATENT DOCUMENTS

| | | | | |
|---|---|---|---|---|
| 6,324,170 | B1 * | 11/2001 | McClennon et al. | 370/286 |
| 6,678,250 | B1 * | 1/2004 | Grabelsky et al. | 370/241 |
| 7,304,962 | B1 * | 12/2007 | Kirla et al. | 370/289 |
| 2008/0049746 | A1 * | 2/2008 | Morrill et al. | 370/389 |

* cited by examiner

*Primary Examiner* — Melanie Jagannathan
(74) *Attorney, Agent, or Firm* — Patton Boggs LLP (57) ABSTRACT

A voice packet dynamic echo cancellation system includes an input/output unit configured to communicate over a packet network and a storage unit configured to store network performance information associated with node segments on the packet network. The system also includes a processing unit in communication with the input/output unit and the storage unit and configured to: set-up a call from an originating call device to a terminating call device; determine the network performance of the call between the originating call device and the terminating call device; locate an echo signal of the call to the originating call device based on the network performance; produce a echo cancellation signal based on the echo signal; and cancel the echo signal with the echo cancellation signal.

17 Claims, 7 Drawing Sheets

VOICE PACKET DYNAMIC ECHO CANCELLATION SYSTEM

BACKGROUND OF THE INVENTION

Telephone calls are often plagued by echoes, which are the reflected copies of the caller's voice that are reflected back by the two wire to the four wire network portion of the far end phone set. The far end reflects back the received voice and the received voice is transmitted back through the line to the caller after a brief delay. Echoes of sufficient delay, such as, for example, a delay of greater than 25 milliseconds, can be detected by the human ear and can degrade a phone conversation to unacceptable levels. Several techniques have been employed to correct the echoes experienced during calls. For instance, a technique known as echo suppression uses a voice activated switch to turn off transmission from the speaker to the listener whenever the caller is silent. Some negative side effects of echo suppression include voice clipping and choppiness, which may further result in voice degradation. Another technology is known as echo cancellation, which is accomplished by sampling the return path for echo signals from 0 to 128 milliseconds windows in which a signal processor looks for an attenuated mirror image of the transmit signal arriving back in the receive path at a lower attenuation during this window. Once the signal is locked on or confirmed, the echo is then cancelled by the processor inducing a cancellation signal (180 degree out-of-phase) matching the delay time and amplitude of the attenuated signal that was originally transmitted.

With the movement of telecommunication services from TDM to voice over Internet protocol ("VoIP"), particularly using plain old telephone service ("POTS") phones that contain the two wire to four wire network component, traditional voice quality impairments have combined with IP-based impairments to degrade the overall quality of VoIP calls. Packet technology, such as VoIP, injects path delay in a call session due to voice codec sampling, and the use of jitter buffers to eliminate packet jitter that is within the network, these attributes make it more difficult to cancellation more difficult and costly due to longer Echo Cancellation sampling windows to detect the longer round trip delays. In place of the switch-based echo cancellers used in time slot based switching protocols, VoIP media gateways or voice codec conversions have become responsible for the echo cancellation functions.

The echo cancellation function takes processing power and memory to facilitate implementing a "tail" or echo cancellation sampling, correspondence, and cancellation functions. Thus, the use of packetized voice communications makes echo cancellation more costly. Media gateways also have limited echo cancellation capacity due to their limited storage capacity, which generally support echo tails of limited window size, such as 28-64 milliseconds. In some applications of packet voice, such as the use of wireless handsets or VoIP over the long distances necessitated for international calls, there may be echoes with significantly longer tail delays than current systems are designed to handle. Further, media gateways do not provide bidirectional echo cancellation capabilities, thus leaving one side of the network uncorrected.

Figure 1:
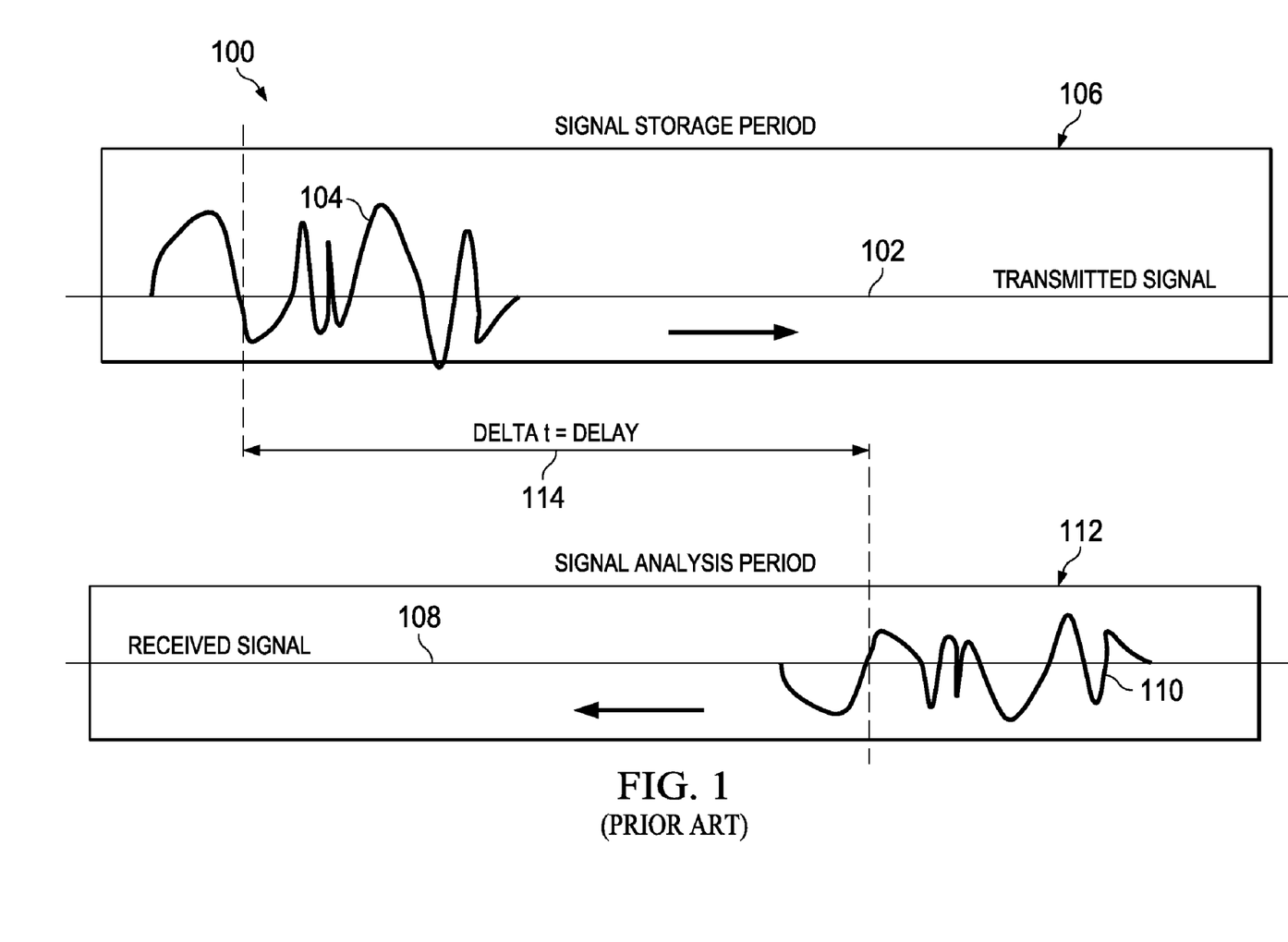
FIG. 1 is an illustration of an echo cancellation scheme including a transmitted signal and a received signal and their corresponding signal windows.

FIG. 1 is an illustration of a transmitted signal and a received signal as commonly known is generally designated 100. A transmitted signal 102 is shown containing a voice signal 104 from a call where they are both shown during a period of time that is illustrated and generally designated as transmitted signal window 106. Transmitted signal window 106 is a period of time in which transmitted signal 102 and voice signal 104 are stored and analyzed for echo cancellation. For example, the amplification and frequency of voice signal 104 on transmitted signal 102 is stored and analyzed to determine signatures of voice signal 104. Transmitted signal window 106 may be any period of time associated with current echo cancellation techniques, such as 64 to 256 milliseconds. Transmitted signal window 106 may be stored for a period of time, such as 64 milliseconds, while a signal processor scans a received signal 108 and an echo signal 110 to determine the time delay 114 between voice signal 104 and echo signal 110. A processor compares the peaks of voice signal 104 and echo signal 110 to determine when echo signal 110 is being received to determine time delay 114. Once echo signal 110 has been detected and time delay 114 has been determined, the processor introduces echo signal 110 180 degrees out-of-phase with echo signal 110 contained in received signal 108 to cancel echo signal 110 from received signal 108. As can be seen, for the processor to determine echo signal 110 of received signal 108, it must scan a large received signal window 112.

Further, to augment media gateways, Internet protocol ("IP") processors may be used that use large amounts of memory, processing power, and algorithms to determine the delay in the echo. If the echo delays are substantial, then these processors become ineffective due to their storage and tracking limitations. For example, some long distance VoIP calls involving Internet routers and switches may produce echo delays of anywhere from 45 to 300 milliseconds. Moreover, if a call involves a wireless RF link as in commonplace cell phone calls, the echo delay may increase even further. For instance, a RF wireless call may have delays of up to 125 milliseconds for one caller on a wireless cell phone where the other caller is on a landline, and up to 250 milliseconds for both callers on wireless cell phones.

SUMMARY

In one embodiment, the present invention disclosed herein comprises a voice packet dynamic echo cancellation system that trains the echo detection mechanism to search for echo starting at a specific delay point in time by determining the round trip delay of the call session via RTP, Ethernet OAM, or any other session or fixed based time detecting mechanism. In one embodiment, the invention uses voice packet dynamic echo cancellation system based on the round trip delay measured via a modification to real-time control protocol ("RTCP") or an Ethernet operations, administration, and management ("OAM") session, such as IEEE 802.1AG per each caller session to detect the exact echo delay over an entire window. This may significantly reduce or simplify the echo cancellation memory and processing power required to identify and lock on to the echo. For example, such system may identify a smaller echo window as opposed to being required to analyze the entire time period from the time of transmission until 300 milliseconds thereafter. Although the transmitted voice may still be stored, the size of the received signal window required for analysis no longer is required over the entire window of time for which the voice is stored. In such an embodiment, the detection window may be set to scan only a few milliseconds, which reduces the need for expensive storage and processing power. Voice packet dynamic echo cancellation system may be implemented in the initial delay detection, periodic checks of the delay detection, or to augment existing functions to trigger a quicker echo cancellation.

In one embodiment, voice packet dynamic echo cancellation system tracks the round trip delay of a VoIP call and then floats a 28-64 millisecond echo cancellation window at the end of the round trip delay. In addition to VoIP calls, the voice packet dynamic echo cancellation system may be used with echo cancellation with evolution-data optimized ("EVDO") devices as well. Moreover, the voice packet dynamic echo cancellation system provides for echo cancellation for Worldwide Interoperability for Microwave Access ("WiMAX") or EVDO that run VoIP to POTS based systems that have echo problems.

In one aspect, the voice packet dynamic echo cancellation system includes an input/output unit configured to communicate over a packet network; a storage unit configured to store network performance information associated with node segments on the packet network; a processing unit in communication with the input/output unit and the storage unit and configured to: set-up a call from an originating call device to a terminating call device; determine the network performance of the call between the originating call device and the terminating call device; locate an echo signal of the call to the originating call device based on the network performance; produce a echo cancellation signal based on the echo signal; and cancel the echo signal with the echo cancellation signal.

The processing unit may be configured to determine a received signal window based on the network performance where the echo signal is located. The processing unit may be configured to search the received signal window for the echo signal of the call. Further, the processing unit may be configured to store the echo signal. In one embodiment, the network performance of the call includes timestamp information related to packets of the call over the packet network. In another embodiment, the processing unit may be configured to access a centralized table containing the network performance of the call on the packet network.

Additionally, in one embodiment, the processing unit, in determining the network performance, is further configured to: determine an initial timestamp for packets associated with the set-up of the call to the terminating call device; determine a final timestamp for packets associated with the set-up of the call to the originating call device; and calculate a time delay for the call over the packet network based on the initial timestamp and the final timestamp. The packet network may communicate performance information data packets. In one embodiment, the packet network communicates IEEE 802.1AG data packets.

In one aspect, the present invention is directed to a method for canceling an echo signal during a call over a packet network including setting up the call from an originating call device to a terminating call device. The method includes storing network performance information associated with node segments on the packet network and determining the network performance of the call between the originating call device and the terminating call device. The method also includes locating an echo signal of the call to the originating call device based on the network performance, producing an echo cancellation signal based on the echo signal, and canceling the echo signal with the echo cancellation signal.

In one embodiment, locating an echo signal of the call may include determining a round-trip time delay of data packets for the call. In another embodiment, storing packet network information may include storing performance information data packets. Additionally, storing packet network information may include storing IEEE 802.1AG data packets. Further, storing network performance information may include storing timestamp information related to data packets of the call. In yet another embodiment, storing network performance information may include storing timestamp information related to data packets of the call over the packet network.

Locating an echo signal of the call may include calculating a received echo signal window for the call. Also, locating an echo signal of the call may include determining an initial timestamp for packets associated with a set-up of the call to the terminating call device, determining a final timestamp for packets associated with the set-up of the call to the originating call device, and calculating a time delay for the call over the packet network based on the initial timestamp and the final timestamp.

In yet another aspect, the present invention is directed to a method for canceling an echo signal during a call over a packet network. The method includes setting up the call from an originating call device to a terminating call device and storing timestamp information related to data packets associated with the call that are communicated over node segments on the packet network. The method also includes determining an echo signal window of the call between the originating call device and the terminating call device based on the timestamp information, locating an echo signal of the call within the echo signal window, and producing an echo cancellation signal based on the echo signal. The method also includes canceling the echo signal with the echo cancellation signal.

In one embodiment, storing timestamp information related to data packets may include storing performance information data packets. Storing timestamp information related to data packets may include storing IEEE 802.1AG data packets. Additionally, locating an echo signal of the call may include determining an initial timestamp for packets associated with a set-up of the call to the terminating call device, determining a final timestamp for packets associated with the set-up of the call to the originating call device, and calculating a time delay for the call over the packet network based on the initial timestamp and the final timestamp. In another embodiment, producing an echo cancellation signal may include inverting the echo signal 180-degrees out-of-phase. In yet another embodiment, canceling the echo signal with the echo cancellation may signal include including the echo cancellation signal with the echo signal of the call to cancel the echo signal.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is an illustration of an exemplary data packet stream including PIP data packets and data packets including real-time and non-real-time content;

DETAILED DESCRIPTION OF THE DRAWINGS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. In the drawings, like or similar elements are designated with identical reference numerals throughout the several views and figures thereof, and various depicted elements may not be drawn necessarily to scale.

Figure 2:
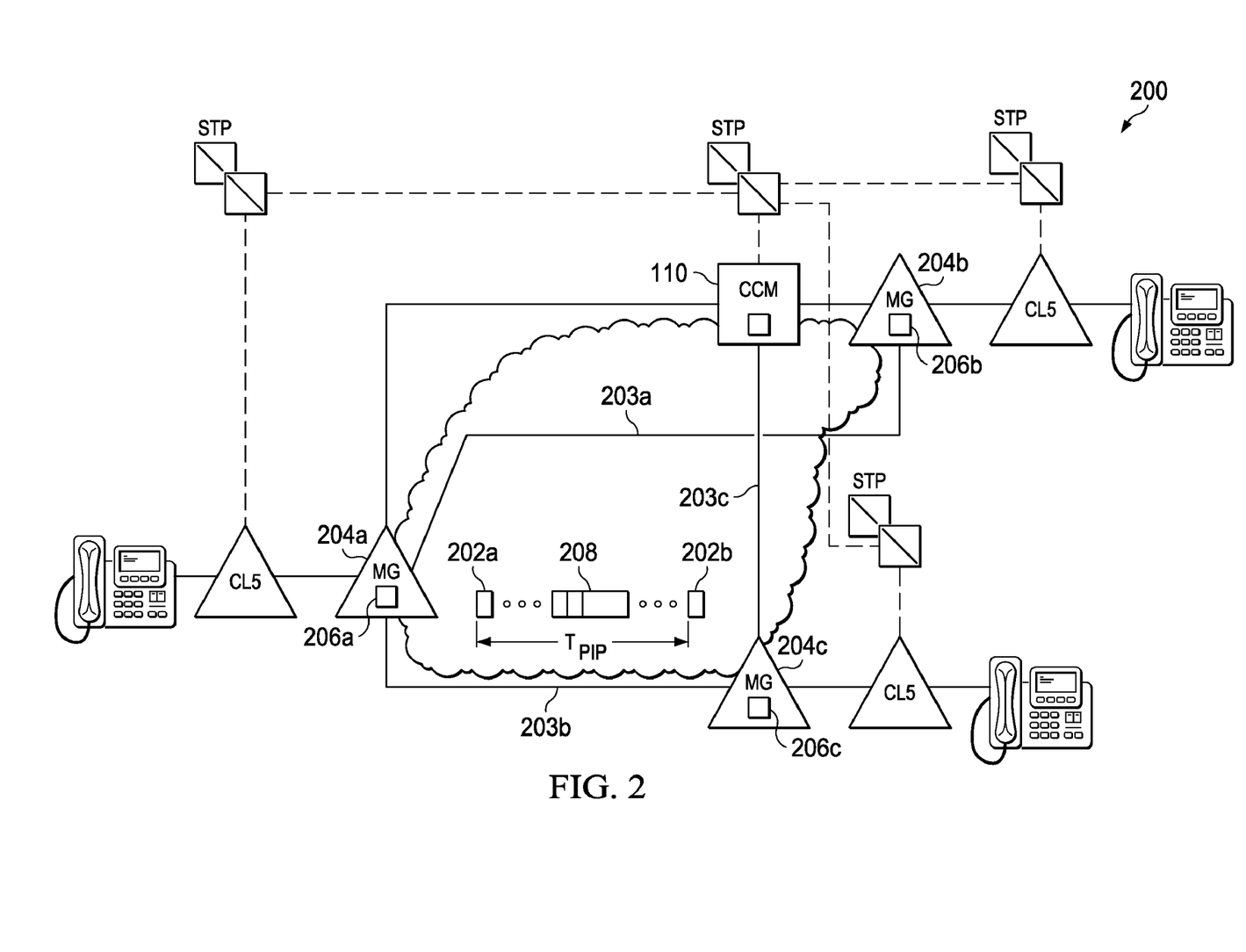
FIG. 2 illustrates a block diagram of an exemplary network for a voice packet dynamic echo cancellation system according to an embodiment of the present invention.

Referring initially to FIG. 2, an exemplary packet network 200 is illustrated that utilizes performance information packets 202a, 202b (collectively 202) communicated in-band, and along virtual packet paths between represented as node links 203a, 203b, and 203c (collectively 203) between network nodes 204a, 204b, and 204c (collectively 204). For purposes of this application, a performance information packet (a "PIP packet" or "PIP data packet") shall mean a packet communicated over data paths of a data packet network that is used by the data packet network to obtain performance information, such as delay time, associated with path transmission states of the data packet network. In one embodiment, such PIP packets are communicated in-band along the data or bearer path of a packet network. However, such PIP packet information may also be communicated out-of-band between network elements of the packet network to provide utilization performance measures to other switching and control systems via control signaling over an Operational Support Network or other operations or maintenance network.

A PIP packet may be communicated between the nodes of a network to establish windows of time in which a node collects or determines network performance information, which may be any information that describes packet utilization and performance of a node, node segment, transmission path, or network element. More particularly, a PIP packet may have a timestamp, counter, sequence number or other identifiers to enable the use of the PIP packet by a network node to establish a sampling window of time for collecting or determining such network performance information, such as delay time of a transmitted voice signal to a received voice signal. Alternatively, a PIP packet may not include such identifier and may instead be generated at regular intervals between nodes of the network. Each network node or path transmission point may transmit PIP packets to a far-end element via the packet transmission path and the far-end element may receive, calculate performance and store the information for use as a utilization and performance measurement or network performance information. Given each communication path may contain information from its transmission to receive paths, the end-points may exchange and track the measures of the bi-directional path via relaying those measures at either given intervals or any other mechanism so that at least one end of the communication path has both the transmit and receive path utilization and performance measurements. The PIP packet may provide a "heartbeat" between network nodes by which the network nodes may use to determine the network performance. A PIP packet may also be used to communicate the collected or determined network performance information between nodes of the network by, for example, including the network performance information in the header or payload portion of the PIP packet. In one embodiment, a PIP packet is an Ethernet Connectivity Fault Management (CFM) packet, such as an 802.1AG packet, and a receiving utilization and performance tracking mechanism may be a ITU Y.1731 protocol stack. However, any packet of data may be utilized under any suitable protocol, as well as calculation methodology to track and store the network performance information.

PIP packets 202 may be formatted to include any information capable of providing information to network nodes to determine network performance information, such as delay time, where the network performance information may include transmission rate, transmission quality, and/or transmission connectivity. Other network performance information, such as communication path utilization, may additionally be determined.

PIP data packets 202 provide a "heartbeat" to enable network nodes 204 at the far-end (i.e., receiving end) to generate network performance information. PIP data packets 202 may be communicated every $T_{PIP}$ seconds, where $T_{PIP}$ may be less than, equal to, or higher than one second and include a timestamp of the time of communication and a counter value indicating the number of packets previously sent to enable a receiving network node to determine whether any data packets were lost between successive PIP data packets. Transmission rate is an indication of the number of data packets communicated over a time period and can be determined by counting data packets communicated over a network segment during a time period, for example. PIP data packets 202 may be used in determining a time period over which to measure the transmission rate. Transmission quality is a measure of link state and may include various link state parameters, including packet loss, jitter, and delay, for example. In one embodiment, PIP data packets 202 may be communicated over Layer 2 of the OSI model and the network performance information may be determined in Layer 2. Network nodes 204 may include transmission performance collection units 206a, 206b, and 206c (collectively 206), respectively, to generate and collect network performance information. Transmission connectivity is an indication of communications between two devices on a network. The connectivity may be indicative of signal strength of communications between the devices, an on/off indication of a device being off or otherwise incapable of communicating, or other suitable performance measures. Transmission performance collection units 206 may generate network performance information in association with PIP data packets 202.

Network performance information may also include information associated with non-packet networks, such as cable DOCSIS, wireless CDMA, TDMA, WiMax, or circuit based networks. Without limiting the foregoing, network performance information may include any data that is associated with any wired or wireless network that may be indicative of or otherwise suitable for use in determining the operation or general health of the network. Network performance information may also include information that is not associated with the communication of data between network elements along connection paths, but is instead associated with the performance of network devices themselves located at a particular node of the network. For example, network performance information may indicate buffer utilization levels, buffer overflows, errors experienced in caching or queuing data, latency introduced by a lack of processing, packet loss across a switching fabric of a particular network device such as a switch and router, or any other performance issue associated with a particular network device. It should be understood that different network types and different connection paths may have different indicia of network performance issues. For example, a T1 line may not have data associated with packet loss, jitter, or latency but may instead only present alarms of red, yellow, or green associated with the perceived performance along a T1 connection path. Similarly, there may be a large amount of data associated with wireless networks that are indicative of network performance such as signal to noise ratio, levels of interference, signal strength, or any other suitable data regarding the performance of the wireless network that may be useful and utilized as network performance information.

Continuing with FIG. 2, in addition to generating network performance information based on PIP data packets 202, the principles of the present invention provide for the network nodes 204 to determine real-time transmission rate or real-time traffic utilization (i.e., a number of data packets including real-time content being communicated over network segments during a time period or, mathematically described, real-time bandwidth use may be determined by tracking the summation of the size of each real-time packet that is transmitted in a given time period, collectively. Alternatively, tracking the real-time packets transmission rate=number of real-time packets*average packet size/given time period). Real-time content is data produced by applications that use real-time and near real-time data packet communications, such as VoIP telephone calls involving POTS phones. Data packets including real-time content (i.e., real-time data packets) may include payload data 208 representative of speech during a telephone call, video data stream during a live event, music stream during a live concert or live radio broadcast, or gaming data, possibly including embedded voice, during a competitive live gaming session, for example. Non-real-time data packets may include payload data representative of content that does not need to be communicated in real-time (e.g., music download, webpage content, program update download, etc.). Total bandwidth transmission rate or total transmission rate may also be determined so that if the real-time transmission rate is known, then the non-real-time transmission rate is also known.

Determining bandwidth usage, both real-time and total bandwidth usage, can be accomplished by tracking either individual data packets and packet flows or internal network element traffic statistics. Collecting the amount of real-time or total bandwidth usage may be performed in a number of ways, including examining a priority bit marking ('P' bit), type of service ("TOS") bit marking, virtual local area network Class of Service ("COS") marking, IP address and/or port. Additionally, probes, queuing, scheduler, bus, or path metrics may also be used with any other information associated with a data packet that is capable of indicating whether one or more data packets are real-time or non-real-time may be used in collecting real-time and non-real-time bandwidth usage. For example, accessing other in-use protocol stacks via probes or "cross stack" communication can provide information from real-time control protocols, such as RTCP and Real Time Protocol ("RTP").

In one embodiment, voice packet dynamic echo cancellation system 200 may use RTCP to monitor the performance of IP session performance (i.e., after a call session has been established) is as defined in IETF RFC 3550. RTCP collects statistics on a media connection, including bytes sent, packets sent, lost packets, jitter, feedback, and one-way trip delay. This may be modified to provide round-trip delay time information by including the information in a PIP packet or 802.1AG packet along with RTCP. Other information may be provided in the RTCP packet using profile specific extensions. RTCP, which operates on a per session basis, is used for quality of service ("QoS") reporting after termination of a session. The statistics information may be used, for example, to improve the QoS by limiting data flow or changing CODEC compression.

In addition, RTP packets may be used to identify real-time bandwidth rate of communication sessions data packets. By determining bandwidth of real-time and total data packets, and optionally other PIP information, a call control manager 210 may manage network communications sessions in a more intelligent manner. Determining transmission rates may be performed at Layer 1 or Layer 2 of the OSI model. However, it should be understood that determining the network performance information may be performed on a different layer if information is available on the different layers to provide enough information to determine bandwidth utilization of real-time and total data packets being communicated over a node segment. These segments may be a shared path resource as in a media gateway to media gateway path, pin-hole firewall access node path, or they could be to a single subscriber end-point or intermediate trunking point. It is understood that multiple communications devices share the same transmission path and no single session controller may have knowledge of the in-use real-time data packet counts or bandwidth state without this information being derived from the use of PIP data packets 202.

Continuing with FIG. 2, the transmission performance collection units 206 may include one or more modules to determine the network performance information, both with respect to the communication of real-time content and non-real-time content, number of real-time sessions, packet loss rate, jitter, delay, etc. The module(s) may be in the form of software executed by one or more processors, hardware (e.g., ASIC chips), external probes, firmware, or a combination of hardware and software, as understood in the art. The modules may be configured to count the number and size of total data packets and bandwidth of real-time data packets and non-real-time data packets that are being communicated over a node segment (i.e., one or more communications links between two network nodes or connections, processes, or components within a network node), also referred to herein as a network segment. A communications path may include one or more node segments. Counts may include data packets and real-time packets with and/or without error rate. It should be understood that counting non-real-time data packets is equivalent to counting real-time data packets and total bandwidth because real-time data packets may be determined by subtracting non-real-time data packets from total data packets and bandwidth. In one embodiment, multiple channels may be utilized to communicate real-time data packets and non-real-time data packets along different paths through one or more devices and communications paths. Channels may include virtual or physical paths constructed of ports, buses, schedulers, shift registers, cards, and chips used to transfer or move packets through the device. Real-time packet flows may be separated by assigning ports, markings, size, type, and/or other sorting and scheduling methods to map specific traffic to a specific route or path. Using different channels for real-time and non-real-time data packets may enable counting real-time data packets and non-real-time data packets faster than having to analyze information contained within the data packets (e.g., P-bit in data packet header).

Alternatively, real-time and non-real-time ports may be configured at a network node to monitor and measure real-time and non-real-time data packets, transmission times, or given path or resource utilization. Real-time and non-real-time bandwidth utilization can also be measured by the amount of time the resource is not in use by multiplying the transmission rate of the path or resource. In addition to measuring the amount of real-time and non-real-time bandwidth utilization, a second measurement to characterize the burst nature (burstiness) of the data flows may be performed. When multiple packet flows of different packetization rates and different bandwidth utilization rates are combined, an average and peak utilization occurs. One example of a measurement to characterize the burstiness of combined real-time flows includes using standard deviation of the peak from the average calculation. Other mathematical methods may be applied to characterize this ability to over-subscribe the real-time flows based on fluxuation in real-time bandwidth usage during the sampling window that calculates average bandwidth use. This added measure of burstiness can be used optionally with the real-time bandwidth usage. Because PIP data packets 202 effectively operate as a clock on an asynchronous network, the transmission performance collection units 206 may monitor and/or inspect PIP data packets 202 to determine rates of total data packets and bandwidth, real-time data packets and bandwidth, and non-real-time data packets being communicated over a network segment.

Figure 3:
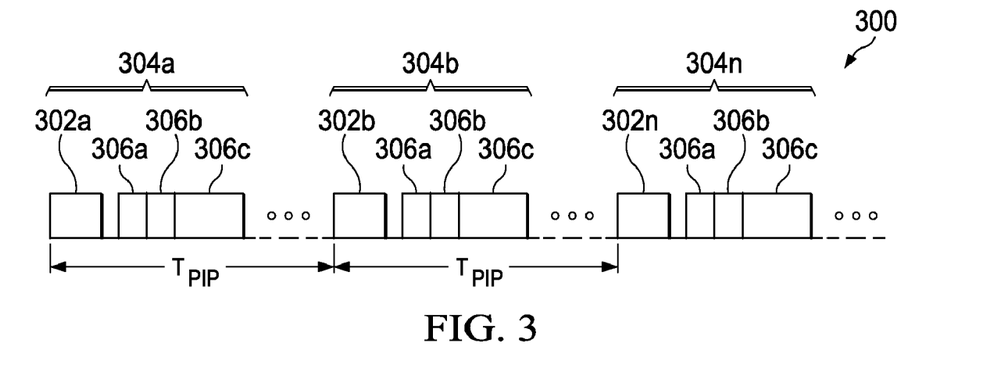
FIG. 3 is a block diagram of an exemplary network node configured to perform functionality in accordance with the principles of the present invention.

Referring now to FIG. 3, an exemplary data packet stream including PIP data packets 302 and data packets 304a-304n (collectively 304), the latter including a packet payload of either real-time or non-real-time content is illustrated and generally designated 300. Each of data packets 304 may include a header portion including a destination address 306a and origination address 306b, among other header information, and a content or packet payload portion 306c that includes either the real-time or non-real-time data along with other transmission characteristics. Although only a single data packet 304a is shown between successive PIP data packets 302a and 302b, as understood in the art, there may be many data packets 304 that are communicated between successive PIP data packets. By determining a total number of data packets and packet size both real-time and non-real-time, communicated during a time duration (e.g., 1 second) and a number of real-time data packets communicated during that time duration, bandwidth of the total number of data packets and real-time data packets communicated over a node link may be determined. Alternatively, the amount of time a communications path or resource is not in a transmission state may be utilized to determine bandwidth and data packets communicated. Additional information, such as the distribution, burstiness, or timing of the real-time flows, may also be made available within PIP packets 302. Together, the real-time and non-real-time packets may be used in conjunction with the link capacity to calculate the average utilization over the interval. The bandwidth determination may be performed by monitoring PIP data packets 302 that are collected to indicate that the time period has completed or inspecting the timestamps contained within each of PIP data packets 302, which may be more accurate. Monitoring PIP packets 302 may include monitoring one or more PIP packets 302. Performance calculation modules may track utilization and performance of communications paths and node segments, and create historical performance and utilization measure logs. Collected performance information may be used to detect threshold crossings to be communicated to session controllers, as further described herein. Other network performance information may be determined by monitoring PIP data packets 302, including jitter, packet loss, and delay, as PIP data packets 302 may include information indicative of time sent and counter value indicative of number of data packets sent between the previous and current PIP packet. The network performance information may further be categorized as real-time, non-real-time, and/or total network performance information (see TABLE I). In one embodiment, intermediate levels may also be established, such as near-real-time, higher priority non-real-time, etc.

Figure 4:
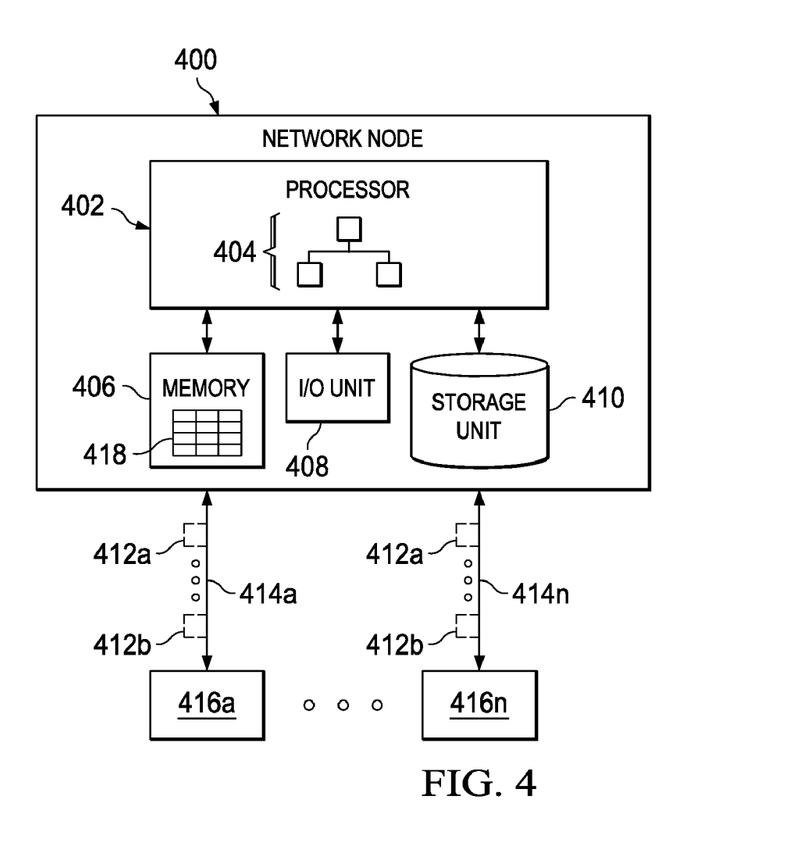
FIG. 4 is a block diagram of exemplary modules configured to determine and collect network performance information in accordance with the principles of the present invention.

Referring now to FIG. 4, a block diagram of an exemplary network node 400 configured to perform functionality in accordance with the principles of the present invention. Network node 400 may include a processing unit 402 that includes one or more processors that execute software 404. In one embodiment, the software 404 may include module(s) that operate as a transmission performance collection function to collect network performance information. The processors 402 may be in communication with a memory 406 configured to store information, such as network performance information, in registers or one or more tables in memory, as understood in the art. The processors 402 may further be in communication with an input/output (I/O) unit 408 that is configured to communicate over one or more communications networks. I/O unit 408 may include one or more access ports (not shown). Processors 402 may also be in communication with a storage unit that is configured to store one or more data repositories (e.g., databases) that store network performance information. The storage unit may work in conjunction with the memory 406. These memory registers are sometimes referred to as bins. The network node 400 may be one of a wide variety of network nodes, including the Maintenance-End-Points ("MEPs") and Maintenance-Intermediate-Points ("MIPs") of a Maintenance Entity Group ("MEG"). The MEPs may include access node devices, such as a digital subscriber line ("DSL") modem, or Cable Modem and its corresponding Access node DSLAM or Cable Management Termination System ("CMTS"). Mobile data element, SIP phone, Video On Demand ("VOD") Server or a Media Gateway ("MG") device, and/or network-to-network interface ("NNI"), for example. Additionally, the MEPs may include user network interfaces integrated access devices ("IADs"), session initiation protocol ("SIP") devices, or other end-user devices or customer premises equipment ("CPE"). The MIPs may include bridges, switches, and routers, for example.

In one embodiment, memory 406 may store network performance information in bins over a short period of time, such as seconds or minutes, and the storage unit 410 may store historical network performance information for longer periods of time, such as hours, days, weeks, or longer periods of time. By storing recent network performance information, remote network nodes (e.g., call control manager, and resource allocation systems and software) may poll the network node 400 for the network performance information and receive the network performance information in a relatively short period of time as compared to the network node 400 having to access the network performance information from the storage unit 410. Periodic updates may be retrieved via polling, event driven on a regular time basis or during unit initiation or power off, or trigger driven events may also be utilized to transmit the network performance information. The network performance information may include network performance information indicative of data packets including real-time and non-real-time content. TABLE I is an exemplary table that describes an example of network performance information as associated with real-time and non-real-time data packets. Although not illustrated, such data may be identified for communication in each direction over a particular node segment.

TABLE I

Real-Time and Non-Real-Time Network performance information

| Characteristic | Real-Time Measure | Total/Average |
|---|---|---|
| Max Packet Count | 877 | 34749 |
| Avg Packet Count | 852 | 32833 |
| Active use time | .87 | 30005 |
| Peakedness characteristic | 128 | 200 |
| Time Period | 1 s | 1 s |
| Number of RT sessions | 156 | 187 |
| Max Bandwidth (Kbps) | 877 | 34.75 |
| Avg Bandwidth (Kbps) | 852 | 32.83 |
| Packet Loss | 37 | 241 |
| Jitter | .004 s | .006 s |
| Delay | .020 s | .028 s |

Although the time period is shown as 1 second, it should be understood that any time period may be utilized to collect the network performance information. Multiple tables or bins may be used to tabulate different time periods, such as 15 minute, 1 hour, 1 day, and so forth, may be managed for storing the same, different, or additional network performance information and, optionally, over different periods of time. In one embodiment, historical network performance information may be stored in a database to enable a call control manager the ability to predict usage of network node 400 during an upcoming time period (e.g., next 5 second, next 2 minutes, next day, etc.). For example, if the network node is over-subscribed with users who perform real-time data downloads during the 7 pm-9 pm timeframe, then the call control manager may utilize that information to route certain calls to other network nodes that have less utilization during that timeframe. In another example, real-time and non-real-time files may be stored on a VOD server, in which case actual real-time use information could be used to load balance system requests. Many other call and network control functions may be employed by knowing the real-time and total data packet network performance information. Other statistical analysis uses of this data are possible. Another near real-time use is a graphical presentation of this data in Operator Network Management Systems ("NMS").

Memory 406 may store a table that includes network performance information, such as timestamps and delay times associated with node segments over which the network node 400 communicates. I/O unit 410 may be utilized to communicate content data packets 412a and PIP data packets 412b (collectively 414) over node segments 414a-414n (collectively 414) to other network nodes 416a-416n (collectively 416).

In one embodiment, the PIP data packets 412b may include network performance information, such as timestamps and time delays, of respective network communications devices associated with a VoIP call made by voice packet dynamic echo cancellation system 200 describing transmission performance over respective node segments 416. In addition, each of the network communications devices 416 may store the network performance information describing the node segments to which each is in communication (e.g., network node 400). The network performance information may be communicated to the network node 400 in each PIP data packet 412b, periodically (e.g., every 100$^{th}$ PIP data packet, once per second, every 5 minutes, etc.), in response to an event (e.g., in response to a network performance information value crossing a threshold value), or in response to a poll or request from the network node 400, for example. The quantity and types of performance information contained in each PIP packet could vary between successive communications. For example, derived or summarized information may be communicated on five minute intervals, and other information may be communicated in other intervals.

As previously described, the software 404 may be configured to generate network performance information associated with node segments between network nodes. A table 418 may include network performance information associated with the network node 400 and network nodes 416 with which the network node 400 communicates. Although the table is shown to be stored in memory 406, it should be understood that the table 418 may be stored in storage unit 410 in that the memory and storage unit, for the purposes of the principles of the present invention, are both considered to be memory. It should further be understood that the term table 418 is generally descriptive of data stored in a defined arrangement of fields and is descriptive of any organized data set, such as a database or data file containing data fields. The term table is also inclusive of multiple tables that are associated with one another.

Table 418 may include segment numbers or other alphanumeric indicia, name of associated segment, and network performance information in one or both directions for each network segment or path (e.g., east-to-west, west-to-east). The network performance information may include additional and/or other information representative of transmission characteristics (e.g., transmission rate and bandwidth) along each bearer path. Although not shown, the network performance information associated with data packets including real-time and non-real-time content (see, for example, TABLE II). Table 418 may also include node segments associated with the internal performance of a network node or network device. For example, if a particular network node is a network switch, the operation of such network switch may impact network performance and thereby may have its own network performance information. For example, a network node, such as a switch or router, may itself cause packet loss or introduce a delay in the delivery of packets. Thus, identifying particular elements or processes within a network node may be useful in determining delay time of a call of VoIP, for example.

Figure 5:
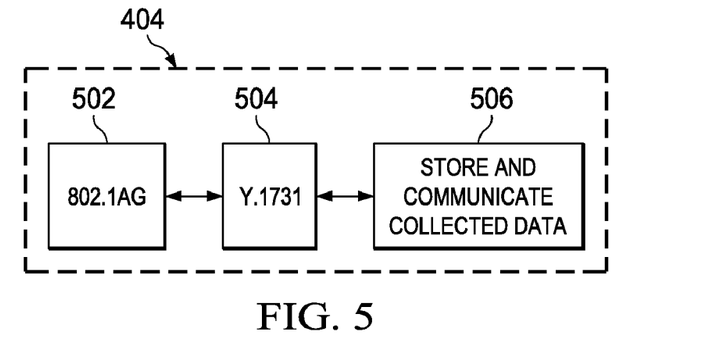
FIG. 5 is an illustration of multiple exemplary data packet networks having exemplary network nodes configured to determine and collect network performance information.

Referring now to FIG. 5, a block diagram of software 404 of FIG. 4 and exemplary modules configured to determine and collect network performance information in accordance with the principles of the present invention is shown. In collecting the network performance information, one embodiment of network node 400 may include IEEE 802.1AG and ITU-T Y.1731 modules 502 and 504, respectively, to generate and receive IEEE 802.1AG data packets and determine network performance information, such as delay time, associated therewith. The ITU-T Y.1731 module 504 may be a modified ITU-T Y.1731 function that is configured to collect network performance information associated with data packets containing both real-time and non-real-time content (see, for example, TABLE I). The modified ITU-T Y.1731 module 504 may be configured to collect performance information, such as maximum and average bandwidth for both real-time and total data packets along with other transmission characteristics that are being received and/or transmitted from the network node. One or more modules 506 may be configured to store and communicate collected transmission performance data. As described with respect to FIG. 4, the transmission performance data may be stored in memory and/or storage unit in one or more data repositories, such as database(s) or table(s). Communication of the collected transmission performance data may be triggered by event threshold crossings or pulled by another network system, network node, Element Management Systems, or call control manager, for example, and be performed on a routine basis or in response to a poll, audit, or event (e.g., dropping below a transmission quality threshold). In addition, although 802.1AG and ITU-T Y.1731 standards are presented for generating PIP data packets and collecting network performance information, the principles of the present invention may use other standards and protocols for collecting network performance information for real-time and total data packets being communicated over a node segment.

Figure 6:
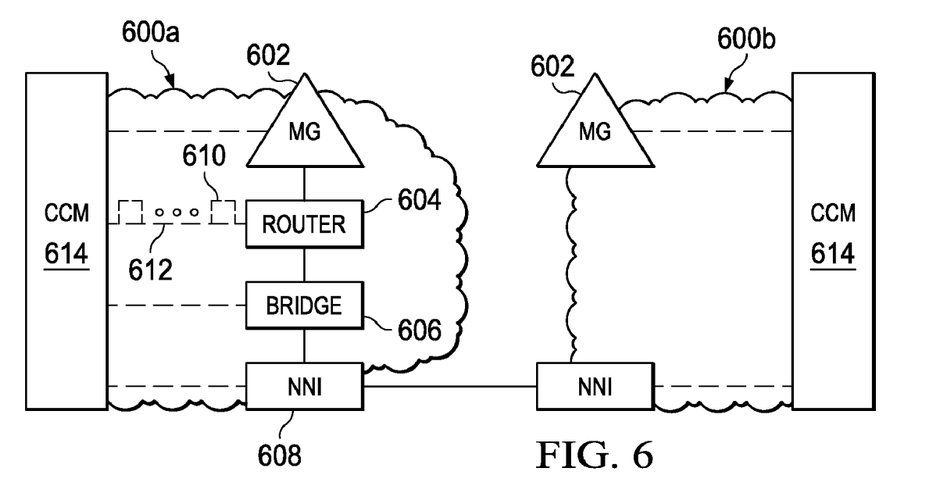
FIG. 6 is a block diagram of an exemplary end or mid-point device showing structural and functional operations used for employing the principles of the present invention.

Referring now to FIG. 6, multiple exemplary data packet networks 600*a* and 600*b* (collectively 600) having exemplary network nodes configured within the networks 600 to determine and collect network performance information is shown. Data packet network 600*a* includes a media gateway 602, router 604, bridge 606, and NNI 608. Other network nodes, such as a session border controller, switch, firewall, computer, satellite, service point or broadband node gateway (VOD server, IP service point, end-point), customer premises equipment ("CPE"), wireless handset, or any other packet service network node may be configured in accordance with the principles of the present invention. More specifically, each of these network nodes may be configured with modules, such as the modules described with respect to FIG. 5, which produce PIP data packets and collect network performance information for both real-time and total data packets communicated over the network. In one embodiment, a network node, such as router 604, may collect and communicate the network performance information in the form of data packets 610 via communication link 612 to a call control manager 614. The communication of the network performance information may be communicated to call control manager 614 in response to a poll from CCM 614, periodically, or in response to an event (e.g., packet loss dropping below a predetermined percentage). Because CCM 614 communicates with multiple network nodes, CCM 614 may be configured to route calls based on the network performance information collected from the network nodes.

PIP data packets that are communicated present an opportunity for network performance information to be communicated along a network path. In one embodiment, network performance information, such as delay time, may be collected and appended to or otherwise inserted into PIP data packets so that other network nodes can monitor performance along a virtual path. For example, the network performance information may be collected by a network node, stored in a database, and a summary may be appended with a PIP data packet and communicated to another network node to which the PIP data packet is communicated. This concatenation process may be performed at regular intervals such as every 5 minutes, hourly, or daily, to minimize the amount of data communicated over the data packet network and stored at network nodes. CCM 614 may collect and store historical network performance information and utilize such information to monitor trends in the network 600*a* and automatically alter network operation or enable network operators to reconfigure the network. For example, if it is determined that the paths to a network node or the network node itself is not operating properly, CCM 614 may choose or establish a virtual path through different network nodes or different paths through the same node than would otherwise not have been established. As another example, if data packets are being lost, the CCM may choose to force existing and new call sessions to use CODECs of a lower compression rate on the node segment to alleviate congestion and improve call connectivity.

Figure 7:
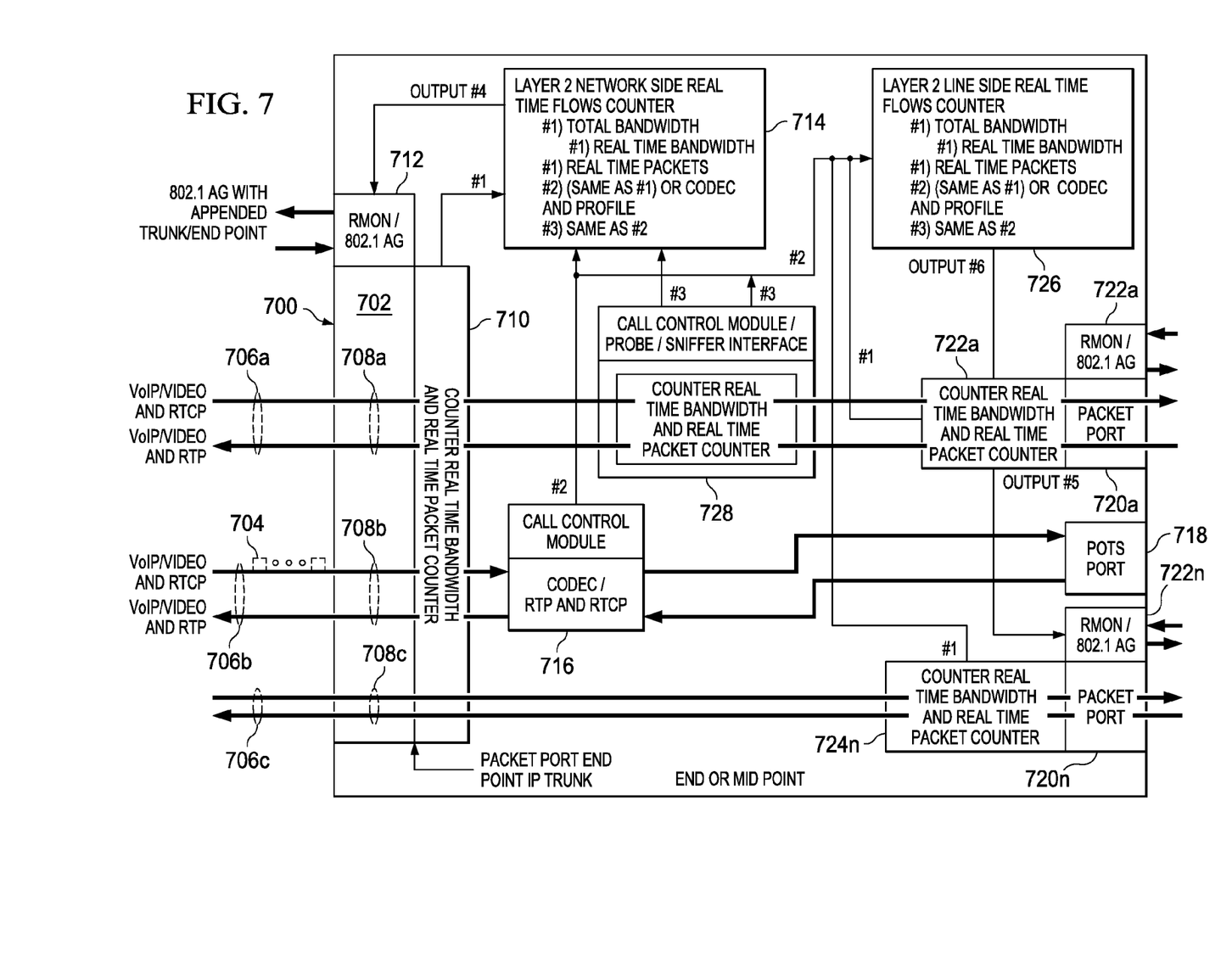
FIG. 7 is a block diagram of an exemplary end or mid-point device showing structural and functional operations used for employing the principles of the present invention.

Referring to FIG. 7, a block diagram of an exemplary end or mid-point device or network communications device 700 showing structural and functional operations used for employing the principles of the present invention. Device 700 includes a network packet port or end-point IP trunk 702 that is configured to transmit and receive real-time traffic, such as VoIP, video, RTCP and other real-time data packets 704, via one or more data ports 706*a*-706*c* (collectively 706). Each of the data ports 706 may have one or more communications lines 708*a*-708*c* (collectively 708). Network counters 710 may operate at network packet port 702 to count data packets including real-time content and total data packets. It should be understood that network packet port 702 may receive data packets including both real-time and non-real-time content and that data packets containing real-time content should not be delayed any more than is proper to allow for real-time communications (e.g., telephone calls) to occur without an end-user noticing the delay.

A remote monitoring function 712 that is associated with network packet port 702 enables various network monitors and console systems to exchange network-monitoring data, in the exemplary case, 802.1AG data. A set of network-side counter functions 714, which may be executed on one or more processors or be a hardware device (modules), operate to count and determine a number of real-time data packets and total data packets (i.e., number of data packet having real-time and non-real-time content), and determine bandwidth for the data packets including real-time content and bandwidth of total data packets over a time period. Network side-counter functions 714 may be performed on each port, line, and/or entity and generate the network performance information (e.g., packet count and bandwidth) for both transmitted and received data packets. Performance collection engines are understood to be located at the same end-point 712 that transmits the PIP information to the far-end. However, the performance collection engines receive a PIP stream from the far-end for the purpose of measurement and collection.

A call control module 716 connected between network packet port 702 and a POTS port 718 on a line side of network communications device 700 may operate to control and manage call connections for a network communications device 700. Call control module 716 may include one or more CODECs using RTP and/or RTCP. Network-side counter functions 714 may be in communication with call control module 716 and generate packet count and bandwidth information based on the data packets being handled by call control module 716. As understood in the art, CODEC stacks may be any session control protocol based or operate in-band, such as Internet Group Management Protocol ("IMGP") for video multicasting, and may have knowledge of the type of call being set-up. Such a configuration also applies to pin-hole firewalls, media gateways, call controllers, and bandwidth reservation protocol systems that use control stacks, bandwidth reservation or resource reservation functionality. It is understood that a network-side counter function may also contain a pseudo utilization counter that indicates bandwidth reservation use information to be passed along with real bandwidth utilization performance and utilization information. The pseudo or reserved use provides an indication of bandwidth use for calls that are being setup, on hold, or simply being reserved. The reservation information may be used in providing the session controllers with the information collected or determined at the network segment. The CODEC stacks and real-time protocols can be used to track correlated per session bandwidth use and report total use to the network side counter function. A few example techniques for counting data packets and determining bandwidth of data packets including real-time data packets and total data packets include: (i) bandwidth use via reading CODEC settings and packetization rates, (a) in use, and (b) reserved, (ii) if IGMP is used for video, (a) track total number of streams—real time, and (b) track individual stream use (bandwidth varies) via CODEC and packetization rates.

Additionally, any network EMS or protocol stack provisioning engine may communicate with the counters 714 and 726 so as to monitor call shaping at network communications device 700. Real-time performance engines and probes may also communicate with control stacks. Client interacting control stacks may enable a user to select functions to perform in user devices. In summary, these applications may be used on (i) virtual, logical, and physical ports, (ii) firewalls, (iii) traffic shaping instances, (iv) service agents, (v) network elements, and element schedulers, (vi) and/or service points, such as gateways, VOD servers, and conference bridges for example.

Network communications device 700 may further include one or more line-side packet ports 720a-720n (collectively 720) that are configured to communicate data packets. The line-side packet ports 720 may include respective remote monitors ("RMONs") 722a-722n (collectively 722), PIP generators, and performance collection elements (not shown), that are used for exchanging network monitoring data with other network devices and counters 724a-724n (collectively 724). Similar to the network side, the line-side may include a set of line-side counter functions 726 that count packets and determine bandwidth of data packets containing real-time content and total data packets. A call control module, CODEC stack, probe/sniffer interface 728 may be connected to a network-side port and line-side port. Call control module probe 728 may be in communication with both network-side counter functions 714 and line-side counter functions 726 to count data packets and determine bandwidth of data packets being communicated between a network-side port and line-side port.

Figure 8:
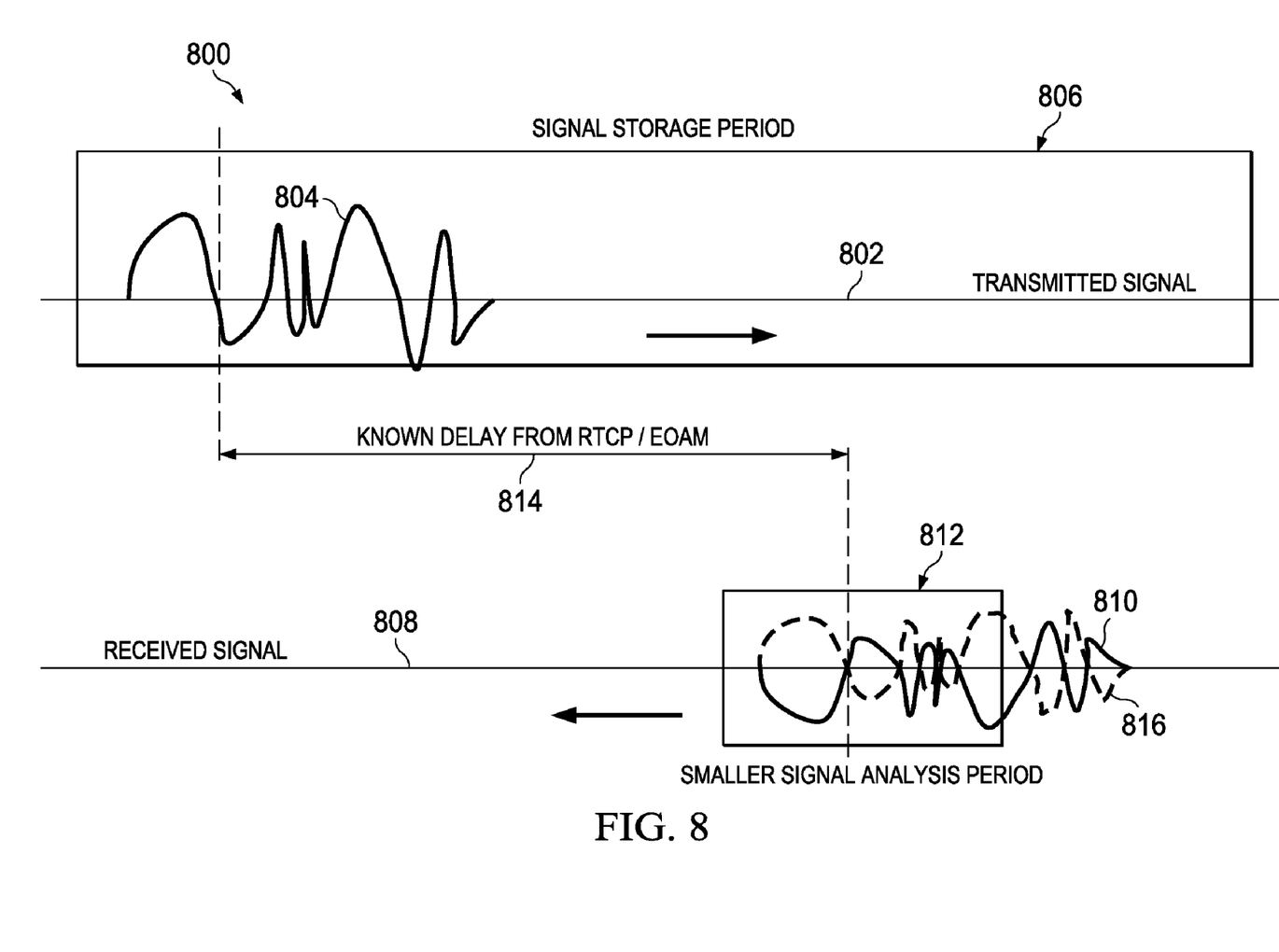
FIG. 8 is an illustration of an echo cancellation scheme including a transmitted signal and a received signal in a narrower and their corresponding signal windows.

Referring to FIG. 8, an illustration of a transmitted signal and a received signal containing a received signal window of the present voice packet dynamic echo cancellation system 200 is generally designated 800. A transmitted signal 802 is shown containing a voice signal 804 from a call where they are both shown during a period of time that is illustrated and generally designated as transmitted signal window 806. Transmitted signal window 806 is a period of time where transmitted signal 802 and voice signal 804 are stored and analyzed by voice packet dynamic echo cancellation system 200. For example, the amplification and frequency of voice signal 804 on transmitted signal 802 may be stored and analyzed to determine signatures of voice signal 804. Transmitted signal window 806 may be any period of time associated with current echo cancellation techniques, such as 64 to 256 milliseconds. Transmitted signal window 806 may be stored for a period of time while voice packet dynamic echo cancellation system 200 determines the delay time between transmitted signal 802 and a received signal 808.

Received signal 808 may include an echo signal 810 that is voice signal 804 being returned in received signal 808. A time delay 814 is the time period between voice signal 804 and echo signal 810, which is determined by voice packet dynamic echo cancellation system 200. As can be seen in FIG. 8, a received signal window 812 is having a smaller magnitude of time period. In accordance with the present voice packet dynamic echo cancellation system 200, an echo cancellation signal 816 is shown that is injected into received signal 808 by voice packet dynamic echo cancellation system 200 for attenuating or canceling echo signal 810. In one embodiment, echo cancellation signal 816 may be echo signal 810 that has been produced as commonly known to 180-degrees out-of-phase with echo signal 810. TABLE II is another exemplary network segment status table that includes counter and timestamp information related to the time periods for the data packets associated with a call of voice packet dynamic echo cancellation system 200. Voice packet dynamic echo cancellation system 200 uses the counter and timestamp information to determine a narrower window which may be used to determine the time delay between voice signal 804 and echo signal 810. The time delay between voice signal 804 and echo signal 810 may be determined by recording the time that the PIP data packet is received and subtracting it from the PIP data packet timestamp for the sent PIP data packet associated with the transmitted signal 802.

TABLE II

| | | | | | | | PIP Data |
| Node | | | | | | Packet | Packet Timestamp |
| Segment | Dir. | Node 1 | Node 2 | Delay | Jitter | Loss | Counter | (hh.mm.ss.dd.mm.yy) |
| --- | --- | --- | --- | --- | --- | --- | --- | --- |
| 414a | East | 400 | 416a | .04 | .002 | 23 | 234723 | 03.18.43.12.07.07 |
| 414a | East | 400 | 416a | .05 | .003 | 18 | 234923 | 03.18.44.12.07.07 |
| 414n | East | 400 | 416n | .03 | .001 | 3 | 74832 | 03.22.17.12.07.07 |
| 414n | East | 400 | 416n | .06 | .002 | 42 | 75832 | 03.22.18.12.07.07 |

The network performance information shown in TABLE II is representative of PIP data packets associated with unidentified content type. However, in accordance with the principles of the present invention, the network performance information may be determined with respect to communications of data packets including real-time content and non-real-time content. TABLE III includes network performance information that distinguishes real-time content and total content (i.e., real-time and non-real-time). Although the direction is shown as going east in both of TABLES III and IV, it should be understood that west direction network performance information may also be included in the table. By providing network performance information specifically related to real-time data packets, an understanding of how the packet network is operating for different content types can be determined. In addition, these tables can provide network performance information for one-way, bi-directional unicast or multicast traffic flows.

TABLE III

Network Segment Status Table - Total and Real-Time

| Node Segment | Dir. | Total BW | Total Delay | Total Jitter | Total Packet Loss | RT BW | RT Delay | RT Jitter | RT Packet Loss | RT Counter | PIP Data Packet Timestamp (hh.mm.ss.dd.mm.yy) |
|---|---|---|---|---|---|---|---|---|---|---|---|
| 414a | East | 1.54 | .04 | .002 | 23 | 1.25 | .03 | .002 | 12 | 234723 | 03.18.43.12.07.07 |
| 414a | East | 1.62 | .05 | .003 | 18 | 1.27 | .07 | .001 | 9 | 234923 | 03.18.44.12.07.07 |
| 414n | East | 1.52 | .03 | .001 | 3 | 0.7 | .05 | .002 | 3 | 74832 | 03.22.17.12.07.07 |
| 414n | East | 2.25 | .06 | .002 | 42 | 1.85 | .04 | .002 | 40 | 75832 | 03.22.18.12.07.07 |

Referring now to FIG. 8, a diagram of a transmitted signal and a received signal are shown according to an embodiment 800 of the present voice packet dynamic echo cancellation system 200. Voice packet dynamic echo cancellation system 200 may use the PIP Data Packet Timestamps shown in TABLES II and III to determine the delay between voice signal 804 and echo signal 810.

Figure 9:
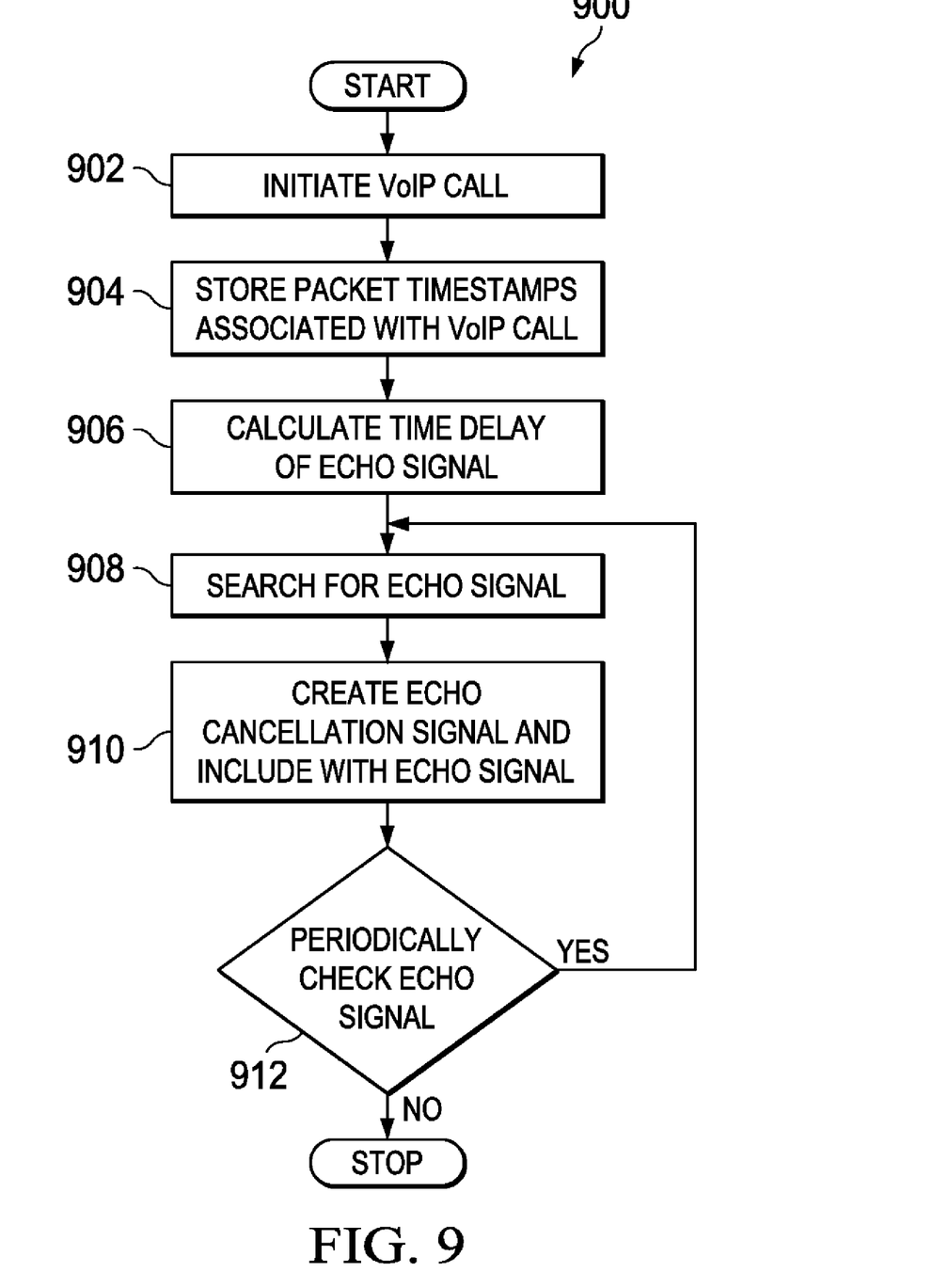
FIG. 9 illustrates a flow chart of an exemplary process for canceling echo signals in a VoIP call according to an embodiment of the present invention.

In addition to the aforementioned aspects and embodiments, the voice packet dynamic echo cancellation system further includes methods for canceling echoes on VoIP calls. FIG. 9 illustrates an embodiment 900 of a method for canceling echoes in VoIP calls. In step 902, a VoIP call is initiated. This step may include a caller dialing a number of a receiver to initiate a call. In one embodiment, a VoIP call may be initiated when it is cut-through to another line. This may be the initial timestamp associated with the round-trip time delay of echo signal 810.

In step 904, voice packet dynamic echo cancellation system 200 stores timestamp information related to PIP packets associated with voice signal 804 and echo signal 810 of a VoIP call. These timestamps may be associated with RTCP, modified RTCP, and/or transmitted signal 802.1AG PIP packets.

In step 906, voice packet dynamic echo cancellation system 200 may calculate an estimated time delay 814 by subtracting the timestamp associated with the packets of voice signal 804 from the timestamp associated with the PIP packets of echo signal 810. The timestamp associated with voice signal 804 may be the initial timestamp as described above. A timestamp associated with echo signal 810 may be the timestamp associated with PIP packets of echo signal 810 and stored to voice packet dynamic echo cancellation system 200. The estimated time delay 814 may be the exact time delay or an approximation of time delay associated with the beginning of echo signal 810.

In step 908, voice packet dynamic echo cancellation system 200 may initiate a search within received signal window 812 to determine a more exact echo delay associated with the VoIP call. This step includes searching received signal window 812 for echo signal 810 that is transmitted in the call signal in the return path. Received signal window 812 associated with this step may be from 10-30 millisecond window, for example. As can be seen in FIG. 8, the processor starts with a starts with a smaller received signal window 112 than those commonly known in the art, such as shown in FIG. 1.

In step 910, voice packet dynamic echo cancellation system 200 creates echo cancellation signal 816 from signal 810 that is 180-degrees out-of-phase with echo signal echo signal 810. Echo cancellation signal 816 may then be injected, interleaved, appended, or otherwise included in received signal 808 to cancel or attenuate echo signal 810 during the VoIP call.

In step 912, voice packet dynamic echo cancellation system 200 may query whether to recheck time delay 814. If the answer to this query is "yes," then voice packet dynamic echo cancellation system 200 proceeds back to step 908 and searches for the beginning of echo signal 810. If time delay 814 has changed from the previous time delay 814, then voice packet dynamic echo cancellation system 200 recalculates time delay 814. If the answer to the query is "no," then voice packet dynamic echo cancellation system 200 may end the process for this VoIP call.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed:

1. A voice packet dynamic echo cancellation system comprising:
    an input/output unit configured to communicate over a packet network;
    a storage unit configured to store network performance information associated with node segments on the packet network, wherein the stored network performance information includes information associated with non-packet networks and information regarding total bandwidth including real-time traffic bandwidth utilization and non-real-time traffic bandwidth utilization, the network performance information being gathered using performance information packets, wherein network nodes along the node segments are configured to generate the performance information packets;
    a processing unit in communication with the input/output unit and the storage unit and configured to:
        set-up a call from an originating call device to a terminating call device;
        determine the network performance of the call between the originating call device and the terminating call device;
        locate an echo signal of the call to the originating call device starting at a specific delay point of a received signal window, the specific delay point determined based on the network performance, wherein the specific delay point reduces a size of a received signal window for locating the echo signal of the call;
        produce a echo cancellation signal based on the echo signal;
        cancel the echo signal with the echo cancellation signal; and
        rechecking the network performance information during the duration of the call and adjusting the specific delay point of the received signal window based on the network performance information.

2. The system according to claim 1, wherein the processing unit is configured to determine a received signal window based on the network performance where the echo signal is located.

3. The system according to claim 1, wherein the processing unit is configured to search the received signal window for the echo signal of the call.

4. The voice packet dynamic echo cancellation system according to claim 1, wherein the processing unit is configured to store the echo signal.

5. The system according to claim 1, wherein the network performance of the call includes timestamp information related to packets of the call over the packet network.

6. The system according to claim 1, wherein the processing unit is configured to access a centralized table containing the network performance of the call on the packet network.

7. The system according to claim 1, wherein the processing unit, in determining network performance, is further configured to:
 determine an initial timestamp for packets associated with the set-up of the call to the terminating call device;
 determine a final timestamp for packets associated with the set-up of the call to the originating call device; and
 calculate a time delay for the call over the packet network based on the initial timestamp and the final timestamp.

8. The system according to claim 1, wherein the packet network communicates performance information data packets.

9. The system according to claim 1, wherein the packet network communicates IEEE 802.1AG data packets.

10. A method for canceling an echo signal during a call over a packet network, the method comprising:
 setting up the call from an originating call device to a terminating call device;
 storing network performance information associated with node segments on the packet network, wherein the stored network performance information includes information associated with non-packet networks and information regarding total bandwidth including real-time traffic bandwidth utilization and non-real-time traffic bandwidth utilization, the network performance information being gathered using performance information packets, wherein network nodes along the node segments are configured to generate the performance information packets;
 determining the network performance of the call between the originating call device and the terminating call device;
 locating an echo signal of the call to the originating call device starting at a specific delay point of a received signal window, the specific delay point determined based on the network performance, wherein the specific delay point reduces a size of the received signal window for locating the echo signal of the call; producing an echo cancellation signal based on the echo signal; cancelling the echo signal with the echo cancellation signal and
 rechecking the network performance information during the duration of the call and adjusting the specific delay point of the received signal window based on the network performance information.

11. The method according to claim 10, wherein locating an echo signal of the call includes determining a round-trip time delay of data packets for the call.

12. The method according to claim 10, wherein storing packet network information includes storing performance information data packets.

13. The method according to claim 10, wherein storing packet network information includes storing IEEE 802.1AG data packets.

14. The method according to claim 10, wherein storing network performance information includes storing timestamp information related to data packets of the call.

15. The method according to claim 10, wherein storing network performance information includes storing timestamp information related to data packets of the call over the packet network.

16. The method according to claim 10, wherein locating an echo signal of the call includes calculating a received echo signal window for the call.

17. The method according to claim 10, wherein locating an echo signal of the call includes:
 determining an initial timestamp for packets associated with a set-up of the call to the terminating call device;
 determining a final timestamp for packets associated with the set-up of the call to the originating call device; and
 calculating a time delay for the call over the packet network based on the initial timestamp and the final timestamp.

* * * * *